United States Patent Office 3,720,627
Patented Mar. 13, 1973

3,720,627
READY-TO-USE LEAD SULFIDE CATALYST
Howell R. Jarvis, Houston, Tex., assignor to Petrolite Corporation, St. Louis, Mo.
No Drawing. Filed Apr. 15, 1971, Ser. No. 134,464
Int. Cl. B01j 11/74
U.S. Cl. 252—430         6 Claims

ABSTRACT OF THE DISCLOSURE

A ready-to-use lead sulfide catalyst for use in the Bender (a registered trademark) sweetening process of sour petroleum products. The lead sulfide catalyst comprises a carrier of particulate inert solids and a relatively dry exposed coating residing about the exterior surface of the solids. The coating is formed of a mixture of sodium sulfide and lead oxide reacted in the presence of an aqueous solution of sodium silicate binder. Preferably, the sodium sulfide is introduced in a stoichiometric amount relative to the lead oxide in the mixture. The catalyst can be protected from oxidizing gases or moisture by a hydrocarbon soluble covering enclosing the coating on the carrier. For example, the coating may be a high-melting point natural, petroleum or synthetic wax.

BACKGROUND OF THE INVENTION

Field of the invention

This invention relates to catalyst compositions useful in the sweetening of sour petroleum products, and more particularly, it relates to a lead sulfide catalyst in a ready-to-use form.

Description of the prior art

For over thirty years, petroleum products contaminated with mercaptans have been sweetened with a lead sulfide catalyst in the Bender sweetening process. Reference may be taken to Reissue Pats. 22,135, 22,136, 22,137 which issued to R. O. Bender on July 31, 1942 for a description of this sweetening process. In this catalytic sweetening process, the sour petroleum product may be a distillate. The distillate is passed through a catalytic bed composed of particles of a suitable base material, such as blast furnace slag, carrying lead sulfide. However, carborundum, sawdust, and other inert solid materials may be used to form the inert particles as described in U.S. Pat. 2,376,223 to R. O. Bender. The lead sulfide catalyst conventionally is made by crushing the blast furnace slag to a size of about 5/16 of an inch or smaller, and screening these particles to select a portion in sizes between 6 and 18 mesh. The screened slag is then wetted with a binder formed of aqueous sodium silicate (e.g., sodium metasilicate). The wetted slag is then coated with particles of lead oxide and dried to harden the binder. The dried catalyst is placed in sacks, drums or otherwise delivered to its subsequent utilization. The catalyst is placed into a reaction vessel where it rests as a bed above a layer of crushed rock or smooth gravel of larger particle sizes supported by a suitable screen. Before the catalyst is used in the sweetening process, the lead oxide in the coating is converted to lead sulfide by one of several available mechanisms. For example, a sour distillate may be employed directly for converting the lead oxide into the lead sulfide. Alternatively, a distillate containing hydrogen sulfide may be passed through the catalyst for the same purpose.

Preferably, the catalyst is activated with a sodium sulfide solution which is an equilibrium mixture of caustic and sodium sulfide. This solution requires additional pumps and personnel for circulating the solution through the catalyst bed in the reaction vessel. The sodium sulfide solution converts the lead oxide substantially completely into the lead sulfide form on the catalyst. Then, the lead sulfide catalyst is washed with relatively dilute caustic to remove any loose lead sulfide which the caustic may have released from the catalyst. The catalyst usually is washed also with water to ensure that there are no free particles which could move through the bed to form a plugging layer in the catalyst.

The conversion in the field of the lead oxide to the lead sulfide on the catalyst requires auxiliary pumps and plant operators in addition to those operations normally used to carry out the sweetening process. For example, between 8 to 16 hours of full-time operating time are required for the field conversion of the catalyst into the desired lead sulfide form. After conditioning of the catalyst, the surplus sodium sulfide and waste caustic solutions, including any water washes, must be disposed of in a manner not to create any pollution problems in refineries or the like. It will be apparent that as protection of the environment becomes more strictly observed, the difficulty of disposing of sulfide-contaminated caustic solutions becomes more difficult and expensive.

Attempts have been made in the past to provide a lead sulfide catalyst directly from manufacture. These attempts have not been made with any acceptable degree of success since the catalyst when exposed to the atmosphere undergoes an oxidation of the sulfide ions which reconverts the catalyst into the lead oxide form. In addition, water in the atmosphere may cause the binder to soften with an undesired mechanical release of the lead oxide during subsequent handling and treatment operations in the sweetening process. The catalyst of the present invention avoids these problems. The novel catalyst may be manufactured in the lead sulfide form and placed directly into operation in the sweetening process without any conversion in the field into the lead sulfide form. In addition, this catalyst resists oxidation in the air or attack by moisture which would degrade its performance in the sweetening process.

SUMMARY OF THE INVENTION

In accordance with the present invention, there is provided a lead sulfide catalyst comprising a carrier of particulate inert solids and a relatively dry exposed coating residing about the exterior surface of these solids. The coating is formed of a mixture of sodium sulfide and lead oxide reacted in the presence of an aqueous solution of sodium silicate binder.

DESCRIPTION OF SPECIFIC EMBODIMENTS

The catalyst of the present invention is an improvement to the Bender catalyst described in U.S. Pat. 2,376,223. In general, the new catalyst contains between 50% and 80% by weight of lead sulfide which is tenaciously bound to inert solids of suitable small particle sizes. These solids can reside in a bed in a reaction vessel in the sweetening operation without packing or solidification to a solid mass or leaving relatively large voids for inefficient sweetening conversion of mercaptans. The particulate inert solids found to be useful for this purpose are those inert chemically and resistant to physical disintegration in the presence of moisture, alkaline materials and petroleum distillates. Specifically, these solids must have sufficient physical strength and rigidity to avoid being crushed when incorporated into beds of substantial depth, as for example fifteen feet. In addition, these solids should retain their physical integrity in contact with the fluid materials during the sweetening operation without swelling, reaction or disintegration. These solids may be blast furnace slag, crushed carborundum, rough-surfaced glass beads and other materials with like physical and chemical properties.

For example, blast furnace slag has been found to be an ideal solid substrate for manufacturing the catalyst. The blast furnace slag is crushed to sizes of about 5/16 of an inch, and then screened to provide a selected portion residing between 6 and 18 mesh. This selected portion of the furnace slag should be clean of any greases or other materials resisting water-wetting of the exterior solid surfaces.

The furnace slag is then placed into a mixing drum, for example a concrete mixer, and therein contacted with a relatively saturated solution sodium silicate (water glass), preferably sodium metasilicate, which forms the binder. The sodium metasilicate is used in an amount which wets the surfaces of the furnace slag but does not leave them in a condition where excess sodium metasilicate will drain from the slag. Preferably, the sodium silicate is employed at elevated temperatures so as to have a relatively high saturation. For example sodium metasilicate and water may be mixed at a temperature of 180° F. to form a 35 Baumé solution. This solution is very viscous but yet readily wets the furnace slag.

The slag, after being wetted with the sodium silicate, is tumbled in the rotating drum with a mixture of sodium sulfide and lead oxide. These materials, in powder form, adhere to the sodium silicate wetted exterior surface of the solids. The sodium sulfide and lead oxide react in the presence of the aqueous sodium silicate to form the lead sulfide coating. As mentioned, the lead oxide is employed in amounts so that on a weight basis, the lead sulfide content of the catalyst will be usually between 50 and 80% by weight. The ingredients are tumbled in the mixing drum until the coating is uniformly distributed about all of the wetted furnace slag. Then, the coated furnace slag is removed and placed into a drying tower.

In the drying tower, air is blown through the mass of subdivided catalyst at elevated temperatures, e.g., 150° F. or higher, for several hours until the coating in converted to a relatively dry form. Then, the catalyst is removed and placed into suitable containers such as sacks or drums for shipment to its subsequent utilization.

The mixture of sodium sulfide and lead oxide which are added to the sodium silicate wetted slag undergo complete reaction in the atmosphere of the tumbling operation in the mixing drum. For example, sufficient moisture is present so that the sodium sulfide and lead oxide react, at least in part, with the conversion of the lead oxide to lead sulfide. In addition, the sodium sulfide is converted into a caustic form, either as sodium oxide or sodium hydroxide depending upon the amount of available water. Preferably, the sodium sulfide is present in a mixture in a stoichiometric amount relative to the lead oxide in the coating. With this arrangement, the lead oxide is substantially completely converted into the lead sulfide form. In addition, the sodium ions are in a highly caustic form in a mixture of sodium oxide and sodium hydroxide. Usually, the amount of sodium oxide relative to sodium hydroxide will be small. However, the drying operation tends to dehydrate the caustic and increase the sodium oxide form. The resultant coating formed of mixture of lead sulfide and the sodium oxide or sodium hydroxide, as the case may be, form a coating which the sodium silicate binder readily attaches to the exterior surface of the furnace slag. Upon drying at elevated temperatures, the binder undergoes a reaction to harden into a very pervious but strong and water resistant form. Thus, the coating is held about the inert solids of the catalyst very tenaciously.

The lead sulfide formed by reaction in the coating is preserved against oxidation air or other oxidizers by the caustic sodium oxide or sodium hydroxide products remaining in the mixture. Any gaseous sulfide ions (hydrogen sulfide) which might escape from the coating will react with the caustic sodium ions and are retained as sodium sulfide. In the presence of any residual amount of moisture in the binder, the lead oxide produced by oxidation will reconvert immediately to the lead sulfide form from the reacted sulfide ions. Thus, the greater the amount of sodium sulfide present in the mixture the less chance there is to lose sulfide ions, as for example hydrogen sulfide, from the surface of the coating. Any amount of sodium sulfide in the mixture provides advantageous results. However, the sodium sulfide in a stoichiometric amount relative to the lead oxide in the mixture provides the best results.

The high alkalinity in the coating provides a substrate for absorption of considerable moisture before accumulating moisture can attack the sodium silicate binder holding the coating to the furnace slag. Also, the sodium sulfide provides an increased depth and permeability to the coating for a given amount of lead sulfide in the catalyst. A greater pervious depth of lead sulfide on a given amount of catalyst compared to the conventional Bender catalyst provides increased reaction area and rate. This greater depth of coating also gives a greater length of operating time during the sweetening of sour hydrocarbons. The lead sulfide may be present in a predominate portion, even approaching 100% of the total lead ion present on the catalyst which increases its mercaptan removal capability.

The catalyst of the present invention was prepared and tested in a pilot plant operation to provide a comparison to conventional Bender catalyst. A sample of the catalyst was prepared to have an active lead content of about 9 pounds per cubic foot of catalyst. The following example provides the data from such experimental test of the catalyst.

EXAMPLE I

Three cubic feet of blast furnace slag (6–18 mesh [1] sizes) was wetted with 5.33 pounds of sodium metasilicate in 2 gallons of water (about 30° Bé.) at a temperature of 180° F. Then, a mixture of 29.1 pounds of sodium sulfide ($Na_2S \cdot 9H_2O$) and 27 pounds of lead oxide were added to the wetted slag. These ingredients were then tumbled in a rotating drum until the mixture was placed about the slag as a uniform coating. The coated slag was air-dried at ambient temperatures.

One and four-tenths feet of catalyst was placed into an upright vessel with a bed volume of 6 inch diameter and 7 feet-9 inch depth in a pilot plant representative of a typical Bender® sweetening process. The catalyst bed was given a light caustic (10%) solution prewash to remove loose fines. A stream of sour kerosene with between 155–165 p.p.m. of mercaptans as passed at about 145° F. through the catalyst at a rate of 100 cc./minute (6.5 b.p.d./cu. ft. catalyst). Air was added to the catalyst bed at rates of 0.2 gram per minute. Sulfur was added to the stream at a rate of between 28 and 33 cc./minute in a kerosene slipstream carrying 10 grams of sulfur per gallon. The effluent kerosene was doctor sweet with a mercaptan content between 1.6 and 3.0 p.p.m. The results of this test, for practical purposes, were identical to operation of the pilot plant with conventional Bender® catalyst which was "sulfided" in place with a solution of sodium sulfide in caustic and then waterwashed before receiving the hydrocarbon stream.

In many cases it will be desired to provide a protective covering about the catalyst after manufacture, especially where it is desirable that the catalyst be shipped in bulk. For example, in many cases the catalyst will be exposed to very severe environmental conditions where air, gases and moisture may be present in amounts sufficient to attack the catalyst beyond the protective capability of the available caustic components. For this purpose, the catalyst of the present invention may be provided with a hydrocarbon soluble covering. Many types of covering will be apparent to those skilled in the art. However, the preferred covering is a high melting point wax. The wax may be of natural or from petroleum origins or even ---
[1] Tyler standard screen scale.

synthetic waxes. The only requirement is that it be solid at the ambient temperatures to which the catalyst is exposed and to be hydrocarbon soluble. Preferably, the covering is non-adhesive. Thus, the covered catalyst may be placed into the reaction vessel and therein contacted by a hydrocarbon solvent which removes the small amount of covering to expose the active sweetening components of the catalyst. The solvent may be the sour hydrocarbon to be sweetened.

The covering may be applied to the catalyst in any particular fashion. For example, the catalyst may be placed into a drum mixer and therein contacted with hot wax or the like to form the desired coating. In addition, the coating may be provided by spraying the covering upon the catalyst, or to employ prilling towers and the like for its application.

It will be apparent that a reaction bed of the present catalyst placed into a vessel is ready for immediate operation in the sweetening process. For example, the catalyst is placed into a reaction vessel and there contacted with a circulating solution of the sour hydrocarbon. If a coating is present, the hydrocarbon will dissolve the covering and expose the active ingredients of the catalyst. The Bender sweetening process is usually operated with the addition of a small amount of air to the hydrocarbon and in some instances a small amount of sulfur. Under these circumstances, the presulfided catalyst of the present invention immediately begins sweetening the sour hydrocarbon during the initial circulation step. After the initial catalyst bed volume of sour hydrocarbon is sweetened, the bed is placed on a continuous treatment basis where the sour hydrocarbon is passed through the catalyst bed under the normal operating conditions for the Bender sweetening process.

It is to be noted that no pretreatment with sulfide ion material, such as hydrogen sulfide, or sodium sulfide and caustic solutions, is required. A light caustic wash is usually not required for removing excess lead materials which were freed from the conventional catalyst during the sulfide conversion step. The obvious saving to the user in personnel, piping, chemicals and equipment to convert the conventional lead oxide catalyst to the lead sulfide form are avoided. In addition, there is no possibility of the caustic and sulfide solutions from causing mechanical or chemical damage to the catalyst during the preconditioning step. Thus, there are no aqueous solutions of caustic and sulfide which must be disposed of from the preconditioning of the catalyst.

The amounts of aqueous sodium silicate solutions employed to wet the furnace slag will necessarily be greater by the amount of sodium sulfide in the mixture. Depending upon the hydration of the sodium sulfide, the amount of sodium silicate solution, and its concentration, is sufficiently variable that no strict guide lines can be made as to the total amount of its requirement. Usually, the amounts of the sodium silicate solutions will be determined empirically by successive additions of the solutions, preferably saturated, to the amount of furnace slag being tumbled in a drum mixer. Then, the coating comprising the mixture of sodium sulfide and lead oxide is applied. Visual observation determines whether or not all of the coating adheres to the furnace slag. Successive amounts of sodium silicate may be added for prewetting the furnace slag until all of the coating adheres to the furnace slag. If excess sodium silicate is employed, the coating on the slag will have a glazed appearance upon drying of the coating on the slag. An overabundance of sodium silicate should be avoided for optimum results in the presulfided catalyst of the present invention.

For the foregoing, it will be apparent that there has been described a lead sulfide catalyst which is in a ready-to-use and very stable form. Various changes and alterations may be made to the described catalyst without departing from the spirit of the present invention. It is intended that such changes and variations be encompassed within the scope of the present invention and reference should be made to the appended claims for this purpose. The description of the present catalyst is intended to be illustrative in nature.

What is claimed is:

1. A lead sulfide catalyst consisting essentially of a carrier of particulate solids which are contacted with a sodium silicate solution for wetting the surfaces of said particulate solids but not in such quantities that excess sodium silicate solution will drain from said particulate solids, tumbling said particulate solids wetted with sodium silicate solution with a mixture of sodium sulfide and lead oxide whereby said sodium sulfide and lead oxide react in said coating and are converted to lead sulfide and highly caustic forms of sodium oxide or hydroxide compounds in the presence of said sodium silicate solution, said lead oxide being present in an amount such that the resultant lead sulfide catalyst has between 50 and 80 percent by weight of lead sulfide and said sodium sulfide being present in a stoichiometric amount relative to said lead oxide in said mixture, said sodium silicate solution being present in an amount such that all of the mixture of sodium sulfide and lead oxide resides as a coating about said particulate solids, but said sodium silicate solution does not form a glazed surface, heating said particulate solids coated with said mixture of sodium sulfide and lead oxide to elevated temperatures at least of 150° F. while passing air through said particulate solids until said coating of said mixture is relatively dry, and said coating is secured to said particulate solids by the reaction product of said sodium silicate solution hardening into a pervious but strong and water resistant form.

2. The lead sulfide catalyst of claim 1 wherein a hydrocarbon soluble, hard-covering encloses the coating on said carrier, and said covering is relatively impermeable to air and moisture.

3. The lead sulfide catalyst of claim 2 wherein said covering is an organic material which is solid and non-adhesive at ambient temperatures.

4. The lead sulfide catalyst of claim 2 wherein said covering is a high melting point wax from petroleum, natural or synthetic origins.

5. The lead sulfide catalyst of claim 1 wherein said particulate solids are blast furnace slag.

6. The lead sulfide catalyst of claim 1 wherein said particulate inert solids are blast furnace slag in sizes to pass through a 6 mesh screen but to be retained upon an eighteen mesh screen.

References Cited

UNITED STATES PATENTS

| | | | |
|---|---|---|---|
| Re. 22,135 | 7/1942 | Bender | 208—198 |
| Re. 22,137 | 7/1942 | Bender | 208—198 |
| 2,879,227 | 3/1959 | Brooks et al. | 208—198 |
| 3,247,089 | 4/1966 | Watson et al. | 208—198 |
| 1,390,683 | 9/1921 | Ellis | 252—430 |
| 3,563,912 | 2/1971 | Young | 252—430 |

PATRICK P. GARVIN, Primary Examiner

U.S. Cl. X.R.

208—198; 252—439

UNITED STATES PATENT OFFICE
CERTIFICATE OF CORRECTION

Patent No. 3,720,627          Dated March 13, 1973

Inventor(s) Howell R. Jarvis

It is certified that error appears in the above-identified patent and that said Letters Patent are hereby corrected as shown below:

Column 4, line 49, for "100", read ---1000---; and

Column 6, line 1, for "For", read ---From---.

Signed and sealed this 10th day of July 1973.

(SEAL)
Attest:

EDWARD M. FLETCHER, JR.
Attesting Officer

Rene Tegtmeyer
Acting Commissioner of Patents